(12) United States Patent
Chen

(10) Patent No.: US 10,019,048 B2
(45) Date of Patent: Jul. 10, 2018

(54) EARLY POWER COMPENSATION METHOD AND APPARATUS THEREOF

(71) Applicant: MediaTek Inc., Hsinchu (TW)

(72) Inventor: Nan-Jang Chen, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 102 days.

(21) Appl. No.: 15/145,097

(22) Filed: May 3, 2016

(65) Prior Publication Data

US 2016/0246363 A1  Aug. 25, 2016

Related U.S. Application Data

(60) Provisional application No. 62/156,408, filed on May 4, 2015.

(51) Int. Cl.
*G06F 1/26* (2006.01)
*G06F 1/28* (2006.01)
*G06F 13/42* (2006.01)
*G06F 1/32* (2006.01)

(52) U.S. Cl.
CPC .......... *G06F 1/26* (2013.01); *G06F 1/28* (2013.01); *G06F 1/3296* (2013.01); *G06F 13/4282* (2013.01)

(58) Field of Classification Search
CPC ... G06F 1/26; G06F 1/28; G06F 1/324; G06F 1/3296; G06F 13/4282
See application file for complete search history.

(56) References Cited

U.S. PATENT DOCUMENTS

| 6,978,388 | B1 * | 12/2005 | Cornelius | G06F 1/305 327/544 |
| 8,816,757 | B1 * | 8/2014 | Yabbo | G06F 1/30 327/538 |
| 9,748,846 | B2 * | 8/2017 | Jiang | H02M 3/1584 |
| 2013/0151877 | A1 * | 6/2013 | Kadri | G06F 1/3203 713/320 |
| 2014/0344590 | A1 * | 11/2014 | Chang | G06F 1/3287 713/300 |

FOREIGN PATENT DOCUMENTS

EP  2916192 A1  9/2015

OTHER PUBLICATIONS

Chen, N.; Designs of Power Distribution Network for Octa-Core Mobile Application Processor; 2015 IEEE 19th Workshop on Signal and Power Integrity (SPI); May 10-13, 2015; Berlin, Germany; IEEE; DOI: 10.1109/SaPIW.2015.237388.
Texas Instruments; LM20333 36V, 3A Synchronous Buck Regulator with Frequency Synchronization; May 2008 (revised Apr. 2013).

* cited by examiner

*Primary Examiner* — Stefan Stoynov
(74) *Attorney, Agent, or Firm* — Han IP Corporation; Andy M. Han

(57) ABSTRACT

Techniques and implementations pertaining to improvements in power delivery for multi-core processors are described. A method may involve determining whether one or more processing units of a plurality of processing units are starting. The method may also involve increasing power provided to the plurality of processing units before the one or more processing units are started responsive to a determination that the one or more processing units are starting.

19 Claims, 10 Drawing Sheets

US 10,019,048 B2

EARLY POWER COMPENSATION METHOD AND APPARATUS THEREOF

CROSS REFERENCE TO RELATED PATENT APPLICATIONS

The present disclosure claims the priority benefit of U.S. Provisional Patent Application No. 62/156,408, filed on 4 May 2015, which is incorporated by reference in their entirety.

TECHNICAL FIELD

The present disclosure is generally related to power delivery for multi-core processors and, more particularly, to novel improvements in power delivery for multi-core processors and apparatus thereof.

BACKGROUND

Unless otherwise indicated herein, approaches described in this section are not prior art to the claims listed below and are not admitted to be prior art by inclusion in this section. With the evolution of advanced integrated-circuit (IC) fabrication technology, the number of components and complexity of circuitry disposed on a chip have been increasing over time. Moreover, in applications such as portable devices (e.g., smartphones), consumer needs and market trend demand more and more functionalities, features and capabilities to be packed in one platform. Accordingly, solutions such as system-on-chip (SoC) and multi-core processors have gained popularity. Such a solution or platform typically includes a power management integrated circuit (PMIC) and a multi-core processor (e.g., application processor or central processing unit (CPU)), with the PMIC providing functions such as battery management, voltage regulation, and charging so as to power the multi-core processor for the multi-core processor to perform various operations.

FIG. 9 illustrates a conventional structure 900 for powering a multi-core processor 930, which is coupled to receive power from a PMIC 910 via a power delivery network 920. The power delivery network 920 includes a first ground plane 922, a second ground plane 924, and a power plane 926 between first and second ground planes 922 and 924. The first and second ground planes 922 and 924 as well as the power plane 926 are disposed in different layers of a printed circuit board (PCB). The power plane 926 is coupled between a power output terminal 912 of PMIC 910 and a power input terminal 932 of multi-core processor 930. The second ground plane 924 is coupled between a first ground terminal 914 of PMIC 910 and a second ground terminal 934 of multi-core processor 930. The power delivery network 920 also includes a pair of differential feedback lines 925A and 925B, with feedback line 925A coupled between a positive feedback terminal (FB+) 916 of PMIC 910 and the power plane 926 and feedback line 925B coupled between a negative feedback terminal (FB−) 918 of PMIC 910 and the second ground plane 924. Differential feedback lines 925A and 925B are used for differential voltage sensing to compensate IR drop between PMIC 910 and multi-core processor 930. The power delivery network 920 includes the PCB and the packages for PMIC 910 and multi-core processor 930. The capacitance of one or more decoupling capacitors (de-caps) is typically from 0.1 µF to 47 µF in the PCB and 0.1 µF in the package. Conventional surface-mount 47 µF capacitors are of 0805 (chip code) with dimensions of 2.0 mm (L)×1.25 mm (W)×1.25 mm (H). The larger the chip code is, the larger the dimension and more expensive, which is harmful to implement in portable devices with lower cost and smaller form factor.

FIG. 10 illustrates a simulation result 1000 of fluctuations in current and voltage with the conventional power delivery network 900 for multi-core processor 930 using a single-sided component placement (SSCP) configuration (depicted in FIG. 7). Referring to FIG. 10, as some or all of the cores of multi-core processor 930 are started up, whether one at a time in sequence or together simultaneously, there are resultant fluctuations and up to 16% voltage droop, as measured from a steady-state voltage level (e.g., 1 V), in the current drawn by the cores as well as in the voltage received by the cores even though some large size and expensive 47 µF de-caps are used in the PCB. This phenomenon tends to negatively impact the performance of multi-core processor 930 due to violation of the specification limit of 12% voltage droop. As any fluctuation in the power provided to multi-core processor 930 is passively sensed through differential feedback lines 925A and 925B, accuracy in the sensed fluctuation in the power provided to multi-core processor 930 tends to be less than ideal. Moreover, due to the passive nature in sensing fluctuations in the power provided to multi-core processor 930, an undesirable voltage droop in the power provided to multi-core processor 930 tends to occur when one or more cores of multi-core processor 930 are started up, as shown in FIG. 10.

SUMMARY

The following summary is illustrative only and is not intended to be limiting in any way. That is, the following summary is provided to introduce concepts, highlights, benefits and advantages of the novel and non-obvious techniques described herein. Select, not all, implementations are further described below in the detailed description. Thus, the following summary is not intended to identify essential features of the claimed subject matter, nor is it intended for use in determining the scope of the claimed subject matter.

In one example implementation, a method may involve determining whether one or more processing units of a plurality of processing units are starting. The method may also involve increasing power provided to the plurality of processing units before the one or more processing units are started responsive to a determination that the one or more processing units are starting.

In another example implementation, an apparatus may include a power management circuit, a multi-core processor comprising a plurality of processing units, a serial bus coupled between the power management circuit and the processor, and a power delivery network coupled between the power management circuit and the processor. The power management circuit may be configured to receive and regulate power from a power source and provide regulated power to the processor via the power delivery network. The processor may be configured to determine whether one or more processing units of a plurality of processing units are starting. The power management circuit may be further configured to adjust an amount of the regulated power provided to the processor before the one or more processing units are started responsive to a determination by the processor that the one or more processing units are starting.

Implementations in accordance with the present disclosure address issues associated with prior art approaches (such as that shown in FIG. 9) by utilizing an active approach in ensuring stability in the power provided to the multi-core processor. Specifically, implementations in accordance with the present disclosure may utilize a novel early power compensation technique to begin charging the power delivery network a period of time before some or all cores of a multi-core processor are started or begin to operate at their higher or maximum operating frequency. Thus, the large size and expensive de-caps (e.g., 47 µF or above) can be saved, even though the SSCP configuration would be implemented to achieve smaller form factor or reduce the platform thickness. Implementations in accordance with the present disclosure also utilize a single-ended feedback line to provide a feedback on the power provided to the processor, and this feature advantageously minimizes the impact on the accuracy in sensing by smaller return loop or impedance. Moreover, with a single-ended feedback line design, the pin count required for both the power management circuit and the multi-core processor may be reduced. Furthermore, routing area on a PCB may also be reduced when a single-ended feedback line is utilized as opposed to a pair of differential feedback lines.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED EMBODIMENTS

Overview

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Figure 1:
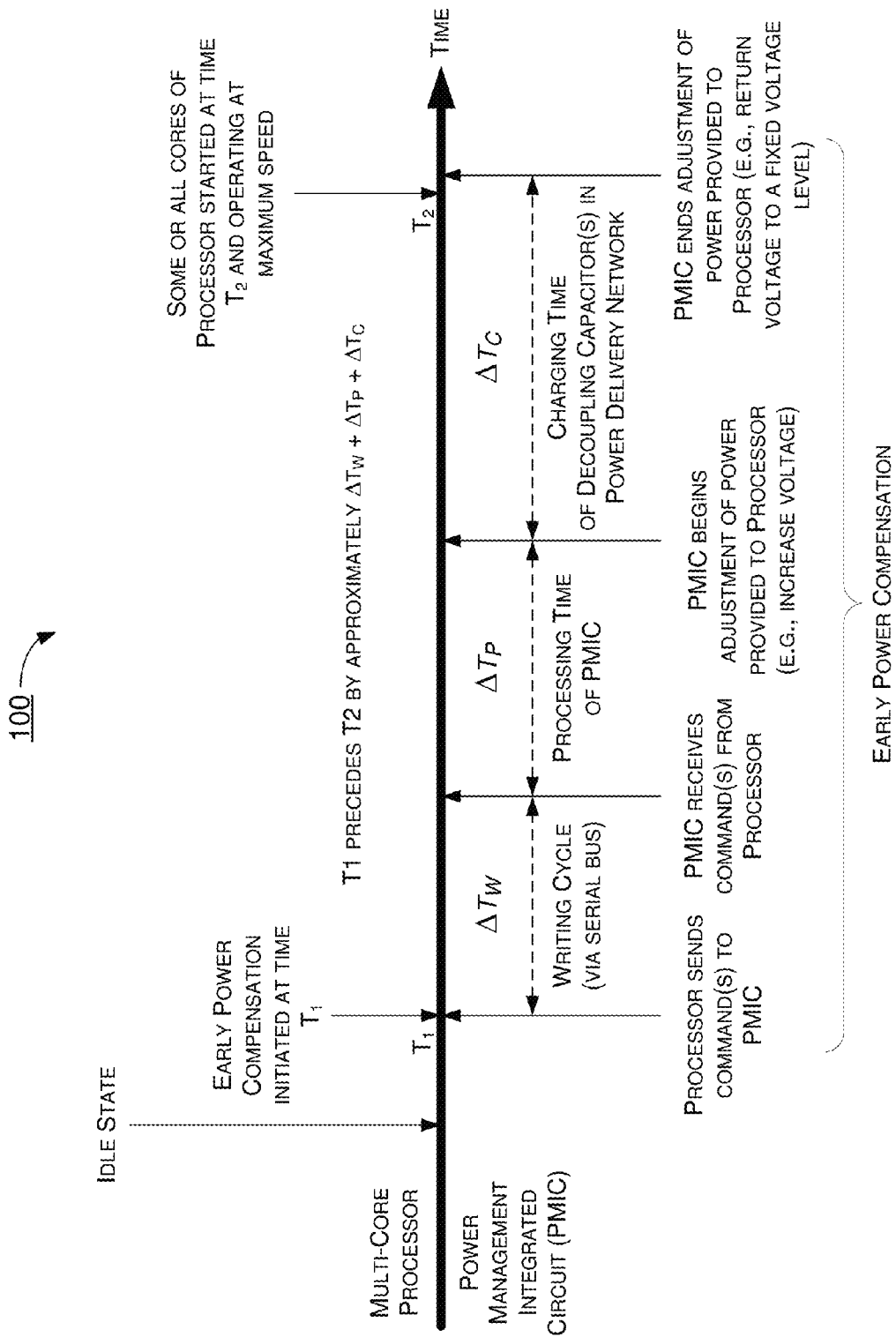
FIG. 1 is a timing diagram of an example scenario of early power compensation in accordance with an implementation of the present disclosure.

FIG. 1 illustrates an example scenario 100 of early power compensation in accordance with an implementation of the present disclosure. Early power compensation according to the present disclosure may be implemented by a power management circuit (e.g., PMIC) associated with a multi-core processor (e.g., application processor or CPU). Initially, the multi-core processor may be at an idle state in which zero, one or few of its multiple cores (herein interchangeably referred to as "processing units") may operate at lower speed or operating frequency (e.g., ≤100 MHz). Prior to some or all of the processing units of the multi-core processor are started and operating at their higher or maximum speed or operating frequency (e.g., ≥1 GHz), early power compensation in accordance with the present disclosure may be initiated. That is, adjustment to electric power provided to the multi-core processor may begin sometime prior to some or all of the processing units of the multi-core processor are started and operating at higher or maximum operating frequency. The adjustment may last for a period of time (e.g., till all the processing units of the multi-core processor have been started and are operating at their higher or maximum operating frequency). In various implementations in accordance with the present disclosure, adjustment to the electric power provided to the multi-core processor may be performed by the power management circuit and may include, for example and not limited to, one or more of the following options: (1) adjusting (e.g., increasing) a voltage of the electric power from an initial level to a higher level (e.g., from 1 V to 1.05 V) and maintaining the voltage at the higher level for a predetermined interval (e.g., 120 ns) before returning to the initial level (e.g., 1 V) or another, lower voltage level (e.g., 0.95 V); (2) adjusting (e.g., increasing) an operating frequency of the power management circuit in a pulse width modulation (PWM) mode; (3) adjusting (e.g., increasing) a system clock for a predetermined interval to allow a higher amount of current drawn by the multi-core processor. In the context of voltage adjustment, the scale of voltage adjustment may be greater than or equal to 10 mV; (4) adjusting (e.g., increasing) a current of the electric power provided to the multi-core processor; and/or (5) adjusting a slew rate associated with the voltage of the electric power provided to the multi-core processor. Accordingly, adjustment to the electric power provided to the multi-core processor to effect early power compensation in in accordance with the present disclosure may involve utilizing one or more of the above-listed options, including adjustment(s) to the voltage, operating frequency, system clock, current and/or slew rate. Thus, although examples provided in the present disclosure may be described in the context of adjustment of voltage (e.g., increasing the voltage of the electric power provided to a multi-core processor) in effecting early power compensation, it shall be understood that one or more of the other options may be additionally or alternatively utilized in various implementations in accordance with the present disclosure.

Referring to FIG. 1, early power compensation may be initiated at time $T_1$ before some or all processing units of the multi-core processor are started at time $T_2$, with time $T_1$ being sufficiently earlier than time $T_2$. Specifically, time $T_1$ needs to be earlier than time $T_2$ by a predetermined interval approximately equal to the sum of an amount of writing cycle time (e.g., 500 ms, which is denoted as $\Delta T_W$ in FIG. 1), an amount of processing time (e.g., 500 ms, which is denoted as $\Delta T_P$ in FIG. 1) and an amount of charging time (e.g., 400 ns, which is denoted as $\Delta T_C$ in FIG. 1). The writing cycle time may refer to the amount time elapsed from the time the multi-core processor transmits or sends a signal containing one or more commands via a serial bus, which may be an inter-integrated circuit ($I^2C$) bus, a serial peripheral interface (SPI) bus, a system management bus (SMB) or a serial low-power inter-chip media bus (SLIMbus), and the time the power management circuit receives the signal. For instance, as an operating system associated with the multi-core processor may be aware that some or all of the processing units of the multi-core processor are about to start, the multi-core processor may send the one or more commands so as to trigger the power management circuit to initiate early power compensation. The processing time may refer to the amount time for the power management circuit to process the one or more commands contained in the signal received from the multi-core processor, and may represent the amount of time elapsed from the time the power management circuit receives the command(s) from the multi-core processor and the time the power management circuit begins adjustment of power provided to the multi-core processor. The charging time may refer to the amount of time for charging one or more decoupling capacitors in a power delivery network through which the electric power is provided to the multi-core processor. The charging time may end as soon as or soon after some or all of the processing units of the multi-core processor have been started and are running at their higher or maximum operating frequency. At the end of charging time, the power management circuit may terminate early power compensation. That is, the power management circuit may restore the electric power provided to the multi-core processor to its status at idle state. For instance, the power management circuit may restore the voltage of the electric power, the operating frequency of the power management circuit in PWM mode and/or the system clock to its/their initial value before early power compensation was initiated. Alternatively, the power management circuit may change the electric power to a state other than its status at idle state and different from its state during early power compensation.

In some implementations, the amount of charging time ($\Delta T_C$) may be greater than or equal to 100 ns. Alternatively or additionally, the amount of charging time may be at least an amount of time that allows at least one decoupling capacitor of a power delivery network to be charged to compensate for less than 12% voltage droop, as measured from a steady-state voltage level (e.g., 1 V), when one or more processing units of a multi-core processor are started.

Figure 2:
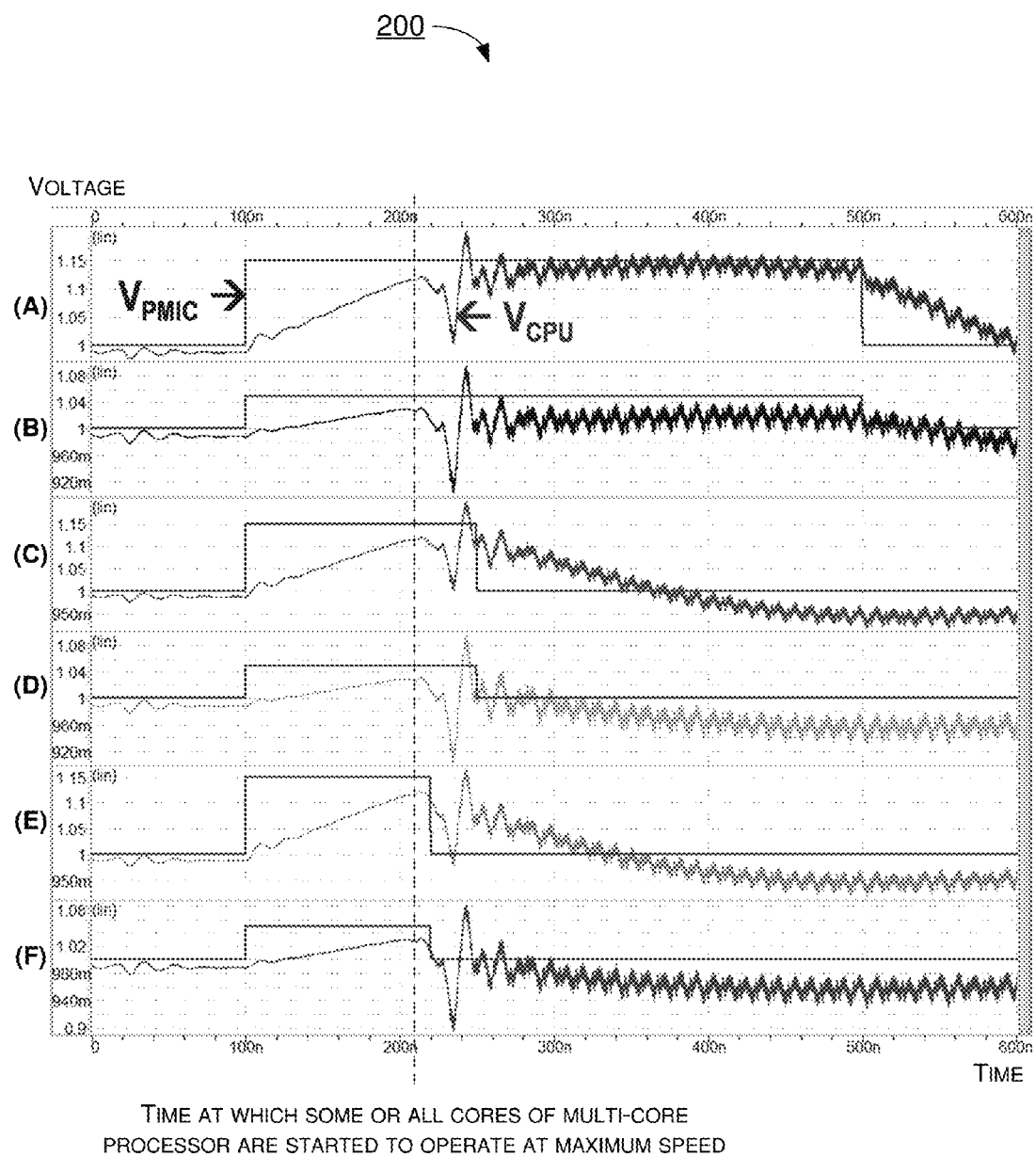
FIG. 2 is a timing diagram of various example simulation results of early power compensation in accordance with an implementation of the present disclosure.

FIG. 2 illustrates various example simulation results 200(A)-200(F) of early power compensation in accordance with an implementation of the present disclosure corresponding to a power delivery network with the SSCP configuration and de-caps from 0.1 µF to 22 µF. In simulation result 200(A) and simulation result 200(B), the amounts of time for which early power compensation is in effect are the same (e.g., 400 ns) while the amounts of voltage increase are different. In simulation result 200(C) and simulation result 200(D), the amounts of time for which early power compensation is in effect are the same (e.g., 150 ns) while the amounts of voltage increase are different. In simulation result 200(E) and simulation result 200(F), the amounts of time for which early power compensation is in effect are the same (e.g., 120 ns) while the amounts of voltage increase are different. The amount of time for which early power compensation is in effect in simulation results 200(A) and 200(B) is longer than that in simulation results 200(C) and 200(D), and the amount of time for which early power compensation is in effect in simulation results 200(C) and 200(D) is longer than that in simulation results 200(E) and 200(F). The amount of voltage increase in simulation result 200(A) is higher than that in simulation result 200(B). Similarly, the amount of voltage increase in simulation result 200(C) is higher than that in simulation result 200(D). Likewise, the amount of voltage increase in simulation result 200(E) is higher than that in simulation result 200(F).

Referring to FIG. 2, in each of simulation results 200(A)-200(F), the power management circuit increases the voltage of electric power provided to the multi-core processor (denoted as $V_{PMIC}$ in FIG. 2) at a predetermined interval before some or all processing units of the multi-core processor are started. Between simulation results 200(A) and 200(B), between simulation results 200(C) and 200(D), and between simulation results 200(E) and 200(F), it can be seen that more voltage increase from 1 V to 1.15 V results in smaller voltage droop on the multi-core processor side (less than 2.5% compared to the steady-state voltage 1 V) in the voltage of the electric power received by the multi-core processor (denoted as $V_{CPU}$ in FIG. 2), as shown in simulation results 200(A), 200(C) and 200(E). Conversely, with less voltage increase from 1 V to 1.05 V, the magnitudes in fluctuations in the voltage of the electric power received by the multi-core processor tend to be larger voltage droop on the multi-core processor side (less than 11% compared to the steady-state voltage 1 V), as shown in simulation results 200(B), 200(D) and 200(F).

Regarding charging time, comparing simulation results 200(A), 200(C) and 200(E), it can be seen that with longer charging time the voltage droop tends to be smaller, and vice versa. Similarly, comparing simulation results 200(B), 200(D) and 200(F), it can be seen that with longer charging time the voltage droop tends to be smaller, and vice versa.

It is noteworthy that, although the examples shown in FIG. 2 involve voltage increase for early power compensation, other parameters may be adjusted to effect early power compensation in accordance with the present disclosure. In other words, although voltage increase is shown as an example way to effect early power compensation, various implementations of early power compensation in accordance with the present disclosure may involve adjustment of parameters other than voltage.

Example Implementations

Figure 3:
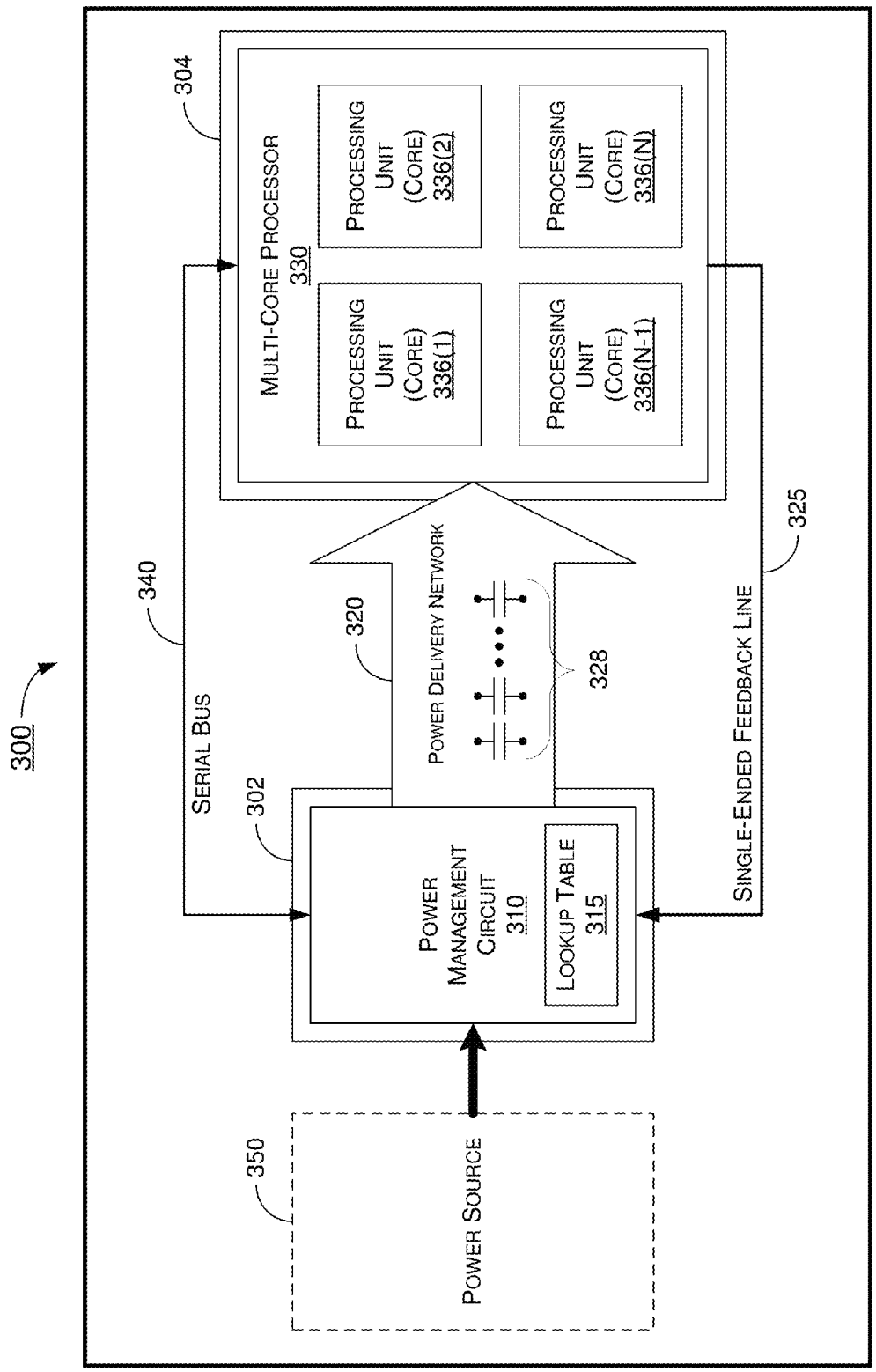
FIG. 3 is a simplified block diagram of an example apparatus in accordance with an implementation of the present disclosure.

FIG. 3 illustrates an example apparatus 300 in accordance with an implementation of the present disclosure. Apparatus 300 may perform various functions to implement techniques, processes and methods described herein pertaining to early power compensation, including scenario 100 and simulation results 200(A)-200(F) described above as well as process 800 described below. Apparatus 300 may be an electronic apparatus which may be a computing apparatus, a portable or mobile apparatus, or a wearable apparatus. For instance, apparatus 300 may be a smartphone, smartwatch, a smart bracelet, a smart necklace, a personal digital assistant, or a computing device such as a tablet computer, a laptop computer, a notebook computer, a desktop computer, or a server. Alternatively, apparatus 300 may be implemented in the form of a single integrated-circuit (IC) chip or a chipset of multiple IC chips. Apparatus 300 may include at least those components shown in FIG. 3, such as a power management circuit 310, a power delivery network 320, a multi-core processor 330 and a serial bus 340. Although not shown in FIG. 3, apparatus 300 may optionally include one or more other components such as, for example, a communication circuit, a display unit and/or a storage device. To avoid unnecessarily obscuring the example shown in FIG. 3 and description thereof, such other component are omitted from FIG. 3 and a description thereof is not provided.

Power management circuit 310 may be in the form of an integrated circuit and may be enclosed, contained or otherwise packaged in a first IC package 302. In some implementations, power management circuit 310 may include an on-die oscillator. Power management circuit 310 may be configured to perform various operations and functions including, for example and not limited to, power conversion, voltage regulation, battery management and charging. Power management circuit 310 may include circuitry for direct current (DC) to DC conversion and/or alternating current (AC) to DC conversion. Power management circuit 310 may include circuitry to allow dynamic voltage scaling, dynamic frequency scaling and/or dynamic voltage and frequency scaling (DVFS). In some implementations, power management circuit 310 may include an error amplifier (not shown) having a first input port and a second input port. The first input port of the error amplifier may be connected to a power ball or a power pin of first IC package 302, and the second input port of the error amplifier may be connected to a local ground plane of first IC package 302.

Multi-core processor 330 may be in the form of an integrated circuit and may be enclosed, contained or otherwise packaged in a second IC package 304. Multi-core processor 330 may be an application processor (e.g., graphics processing unit (GPU) or a CPU. Multi-core processor 330 may support applications running in a given operating system environment, and may provide a self-contained operating environment that delivers system capabilities needed to support applications of apparatus 300 including, for example and not limited to, memory management, graphics processing, multimedia decoding, computation and the like. In operation, multi-core processor 330 may be in an idle state in which zero, one or few of the processing units of multi-core processor 330 may perform minimal operations to sustain the system. At other times, some or all of the processing units of multi-core processor 330 may perform operations and/or computations simultaneously, with each processing unit operating at one of multiple possible operating frequencies. Multi-core processor 330 may include multiple processing units 336(1)-336(N), with N being a positive integer greater than 1. Multi-core processor 330 may include at least two cores or processing units. For instance, in various implementations, multi-core processor 330 may include two, four, six, eight, ten, twelve or more cores/processing units. Multi-core processor 330 may be configured to determine whether one or more of the processing units 336(1)-336(N) are starting soon. For instance, an operating system executing on multi-core processor 330 may, based on application(s) running at a given time, determine that one or more additional processing units of the multiple processing units 336(1)-336(N) may need to be started in order to support demands by currently running application(s) and/or soon-to-be-running application(s).

Power delivery network 320, which may include a PCB and a corresponding package, may be electrically coupled between power management circuit 310 and multi-core processor 330 to provide electric power from power management circuit 310 to multi-core processor 330. For instance, power management circuit 310 may receive electric power from a power source (e.g., an external power source such as AC mains or an internal power source 350 such as a battery) and regulate the received power to provide regulated power to multi-core processor 330 via power delivery network 320. Power delivery network 320 may include wires, lines (herein interchangeably referred to as "traces") and/or electrically-conductive plating as well as electronic components such as one or more decoupling capacitors 328. The one or more decoupling capacitor 328 may be charged by power management circuit 310 to hold a relatively large electric charge. It is noteworthy that the bulk capacitance in the power delivery network 320 without early power compensation would be insufficient to supply the large inrush current due to channel impedance and IR droop. Advantageously, having the one or more decoupling capacitors 328 holding a relatively large electric charge allows the voltage of the regulated power provided to multi-core processor 330 to be increased so as to compensate for a large current draw when some or all of the processing units 336(1)-336(N) of multi-core processor 330 are started simultaneously (and operate at their higher or maximum operating frequency). In some implementations, a capacitance of the one or more decoupling capacitors 328 may be from 0.1 µF to 22 µF in the PCB and from 1 µF to 2.2 µF in the package of power delivery network 320. In some implementations a height of the one or more decoupling capacitors 328 may be less than 1.25 mm. Typical surface-mount 22-µF capacitors are of 0603 (chip code) with dimensions of 1.6 mm (L)×0.8 mm (W)×0.8 mm (H), which are smaller than those of 0805 (chip code). Therefore, implementation of portable devices with lower cost and smaller form factor is possible.

Serial bus 340 may be electrically coupled between power management circuit 310 and multi-core processor 330 to allow communication therebetween. For instance, multi-core processor 330 may transmit a signal containing one or more commands to power management circuit 310 via serial bus 340 to trigger power management circuit 310 to initiate early power compensation in accordance with the present disclosure. Serial bus 340 may be, for example and not limited to, serial bus comprises an inter-integrated circuit ($I^2C$) bus, a serial peripheral interface (SPI) bus, a system management bus (SMB) and/or a serial low-power inter-chip media bus (SLIMbus).

Figure 9:
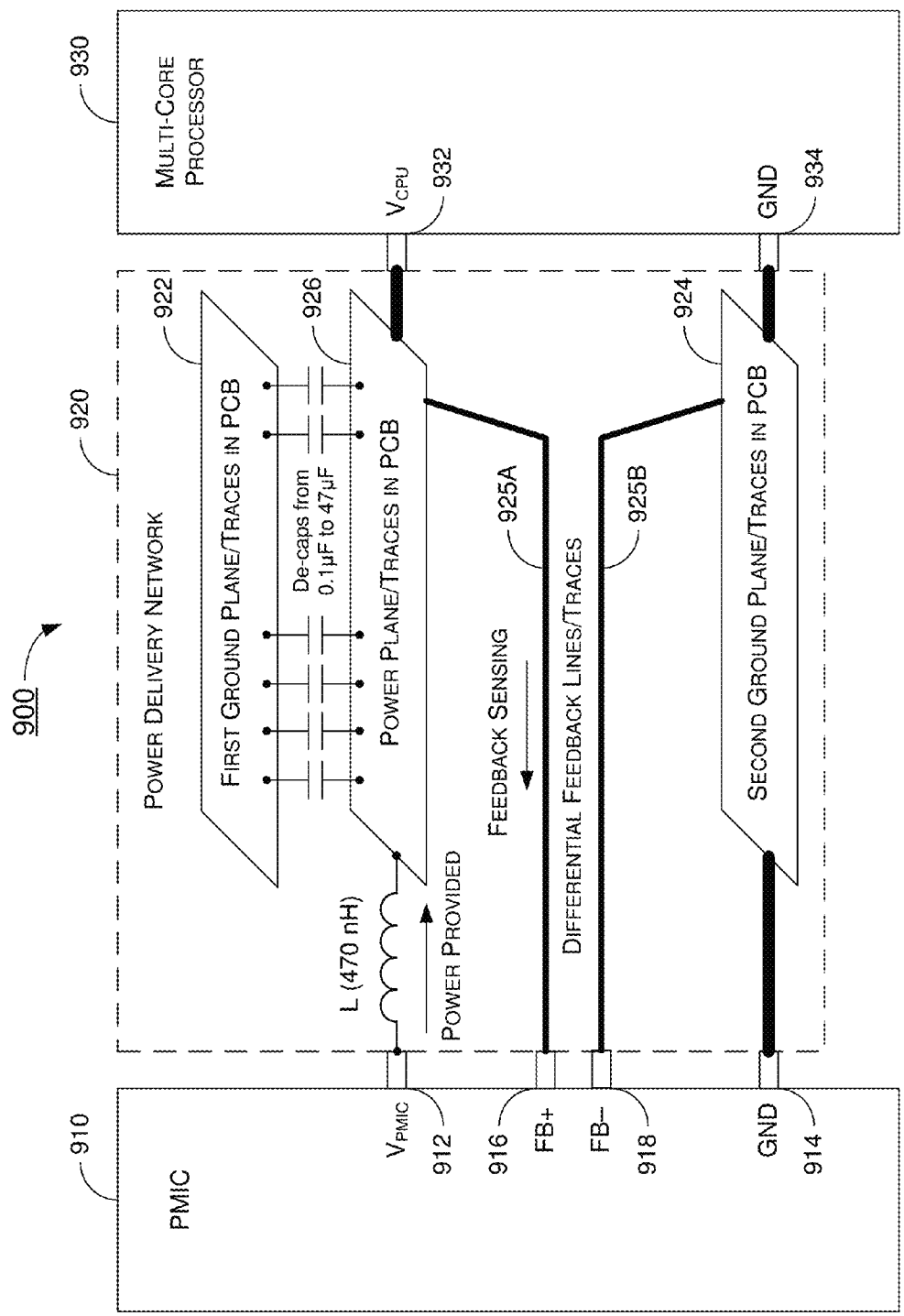
FIG. 9 is a simplified diagram of a conventional structure for powering a multi-core processor.
Figure 10:
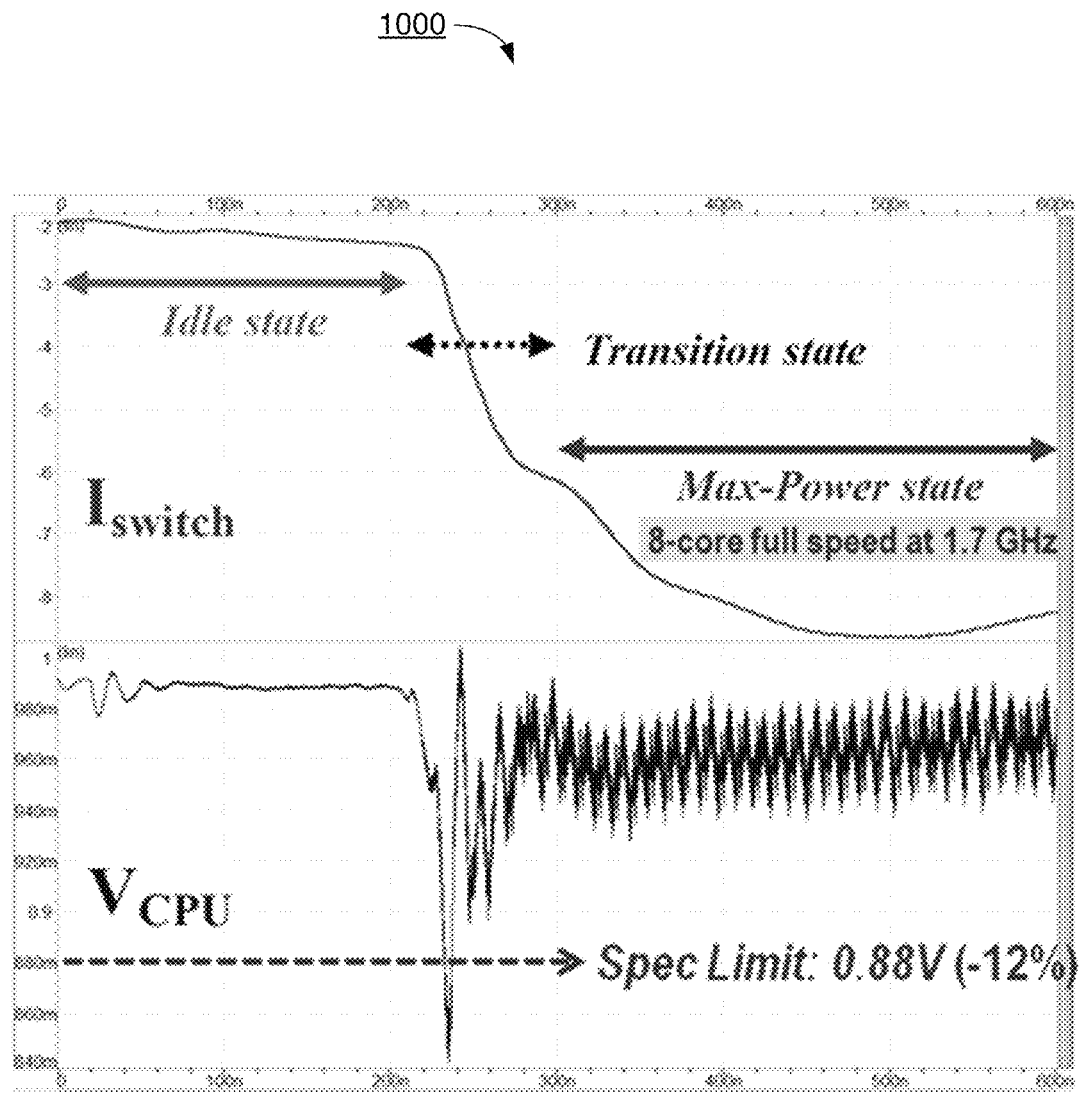
FIG. 10 is a timing diagram of a simulation result of fluctuations in current and voltage with a conventional power delivery network for a multi-core processor.

Power delivery network 320 may include a feedback line 325, which may be electrically coupled between power management circuit 310 and multi-core processor 330 to provide a feedback to power management circuit 310 so as to allow power management circuit 310 to sense the power received by multi-core processor 330. Different from feedback lines in the prior art, such as the differential feedback lines 925A and 925B in FIG. 9, feedback line 325 may be a single-ended feedback line. More description of feedback line 325 is provided below with respect to FIG. 4.

In effecting early power compensation in accordance with the present disclosure, power management circuit 310 may be configured to adjust an amount of the regulated power provided to multi-core processor 330 before one or more processing units of the multiple processing units 336(1)-336

(N) are started in response to a determination by multi-core processor 330 that the one or more processing units are starting. In some implementations, power management circuit 310 may be configured to receive, from multi-core processor 330 via serial bus 340, a signal indicating that the one or more processing units are starting. For instance, the signal may contain or otherwise represent one or more commands from multi-core processor 330 triggering or otherwise commanding power management circuit 310 to initiate early power compensation in accordance with the present disclosure.

In some implementations, in adjusting the amount of the regulated power provided to multi-core processor 330 before the one or more processing units are started, power management circuit 310 may be configured to increase an amount of the regulated power provided to multi-core processor 330 at least a period of time before the one or more processing units are started. For instance, referring to FIG. 1, when the one or more processing units are starting at time $T_2$, multi-core processor 330 may transmit a signal to power management circuit 310 at time $T_1$ to trigger power management circuit 310 to initiate early power compensation. In some implementations, the period of time may be based at least in part on a speed of serial bus 340, an amount of charging time for charging at least one decoupling capacitor of the one or more decoupling capacitors 328 of power delivery network 320, a quantity of the one or more processing units of the multiple processing units 336(1)-336(N) that are starting, or a combination of the above.

In some implementations, in adjusting the amount of the regulated power provided to multi-core processor 330 before the one or more processing units are started, power management circuit 310 may be configured to perform a number of operations. For instance, power management circuit 310 may determine, using a lookup table 315, an amount of power increase and an amount of time for the power increase based on a quantity of the one or more processing units that are starting. Additionally, power management circuit 310 may increase the amount of regulated power provided to multi-core processor 330 by the determined amount of power increase and for the determined amount of time. As an example, power management circuit 310 may have lookup table 315 stored in an internal memory thereof. Lookup table 315 may include tabulated information of the amount of adjustment and duration of adjustment to be made to the regulated power provided to multi-core processor 330 corresponding to the quantity of processing unit(s) to be started (one at a time in sequence or together simultaneously) which may or may not be started to operate at their maximum operating frequency. In adjusting the amount of the regulated power provided to multi-core processor 330 before the one or more processing units are started, power management circuit 310 may be configured to adjust a voltage, an operating frequency, a system clock, or a combination thereof with respect to the regulated power provided to multi-core processor 330. For example, in the context of adjustment to the voltage of the regulated power provided to multi-core processor 330, lookup table 315 may include correlations of quantities of processing units to be started, operating frequencies and the corresponding amounts of voltage increase as well as the corresponding durations for the voltage increase.

Alternatively or additionally, in adjusting the amount of the regulated power provided to multi-core processor 330 before the one or more processing units are started, power management circuit 310 may be configured to charge at least one decoupling capacitor of the one or more decoupling capacitors 328 for at least an amount of charging time proportional to a quantity of the one or more processing units that are starting. In some implementations, the amount of charging time may be at least an amount of time that allows the at least one decoupling capacitor to be charged to compensate for less than 12% voltage droop, as measured from a steady-state voltage level (e.g., 1 V), when the one or more processing units are started.

Figure 4:
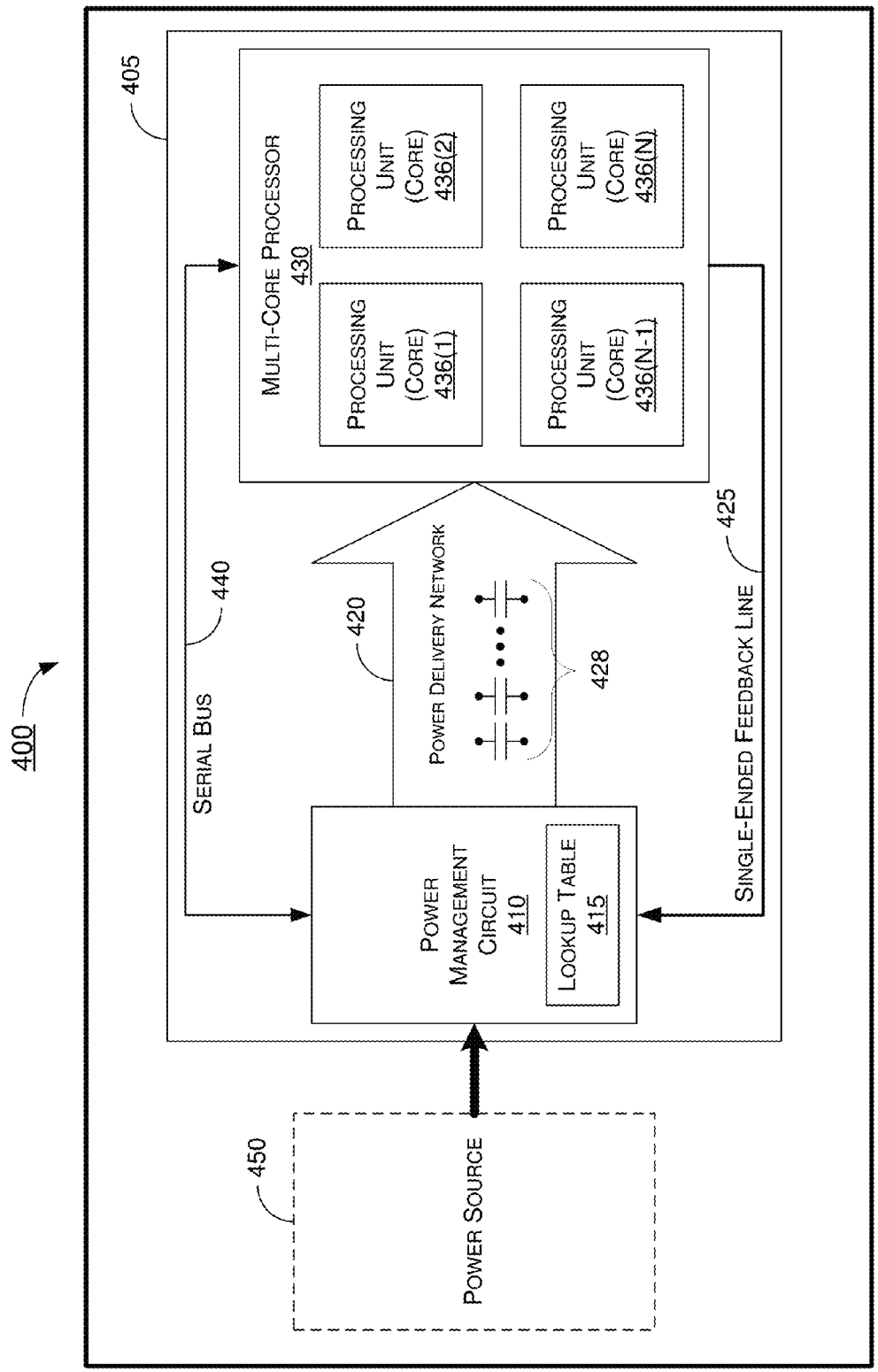
FIG. 4 is a simplified block diagram of an example apparatus in accordance with another implementation of the present disclosure.

FIG. 4 illustrates an example apparatus 400 in accordance with another implementation of the present disclosure. Apparatus 400 may perform various functions to implement techniques, processes and methods described herein pertaining to early power compensation, including scenario 100 and simulation results 200(A)-200(F) described above as well as process 800 described below. Apparatus 400 may be an electronic apparatus which may be a computing apparatus, a portable or mobile apparatus, or a wearable apparatus. For instance, apparatus 400 may be a smartphone, smartwatch, a smart bracelet, a smart necklace, a personal digital assistant, or a computing device such as a tablet computer, a laptop computer, a notebook computer, a desktop computer, or a server. Alternatively, apparatus 400 may be implemented in the form of a single integrated-circuit (IC) chip or a chipset of multiple IC chips. Apparatus 400 may include at least those components shown in FIG. 4, such as a power management circuit 410, a power delivery network 420, which may include a PCB or a package, a multi-core processor 430 and a serial bus 440. As shown in FIG. 4, power management circuit 410 may store therein a lookup table 415. Multi-core processor 430 may include multiple processing units 436(1)-436(N). Power delivery network 420 may include a single-ended feedback line 425 and one or more decoupling capacitors 428 in the PCB or the package of power delivery network 420. Optionally, apparatus 400 may include an internal power source 450 which may be a battery for example. Although not shown in FIG. 4, apparatus 400 may optionally include one or more other components such as, for example, a communication circuit, a display unit and/or a storage device. To avoid unnecessarily obscuring the example shown in FIG. 4 and description thereof, such other component are omitted from FIG. 4 and a description thereof is not provided.

Apparatus 400 may be similar or identical to apparatus 300 for the most part. For example, multi-core processor 430 may be similar or identical to multi-core processor 330. Thus, in the interest of brevity and to avoid redundancy, the following description of apparatus 400 is focused on differences between apparatus 400 and apparatus 300. In other words, any component and/or functionality of apparatus 400 not described herein is similar or identical to that of apparatus 300.

Different from apparatus 300, power management circuit 410, part of power delivery network 420 and multi-core processor 430 may be packaged in a single IC package 405. For instance, power management circuit 410 may be implemented as an on-die regulator. In some implementations, power management circuit 410 may include an on-die oscillator. Moreover, serial bus 440 may be an inter-integrated circuit ($I^2C$) bus. Alternatively or additionally, part of power delivery network 420 may be coupled to the PCB for additional decoupling capacitors (not shown).

Figure 5:
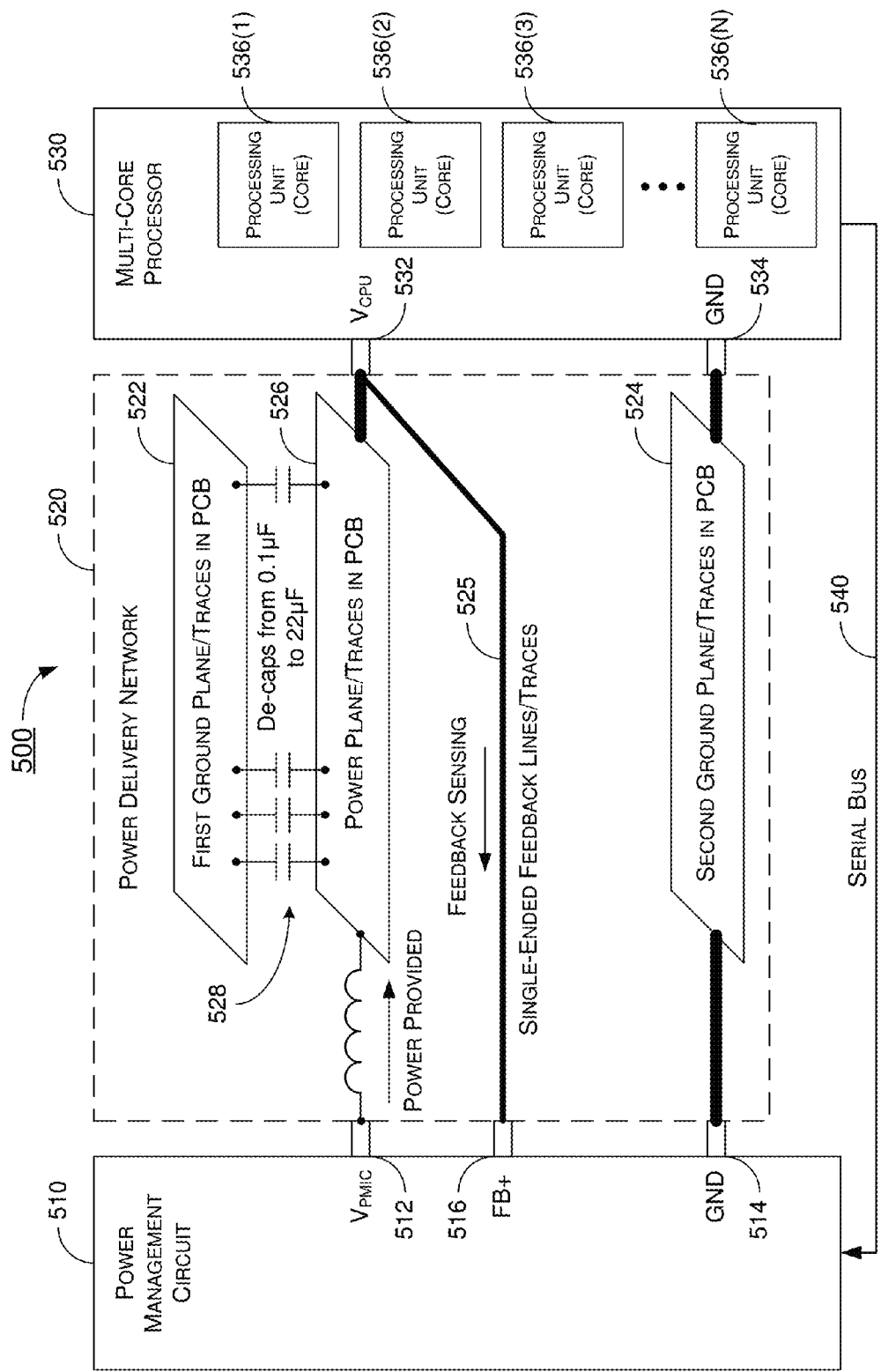
FIG. 5 is a simplified diagram of an example structure in accordance with an implementation of the present disclosure.

FIG. 5 illustrates an example structure 500 in accordance with an implementation of the present disclosure. Structure 500 may include a power management circuit 510, a power delivery network 520, which may include a PCB and a corresponding package, and a multi-core processor 530 including multiple processing units 536(1)-536(N) with N being a positive integer greater than 1. Structure 500 may be an example implementation of parts of apparatus 300 and/or apparatus 400. For instance, power delivery network 520 may be an example implementation of power delivery network 320 of apparatus 300 and/or power delivery network 420 of apparatus 400.

Power delivery network 520 may include at least a first ground plane (or traces) 522, a second ground plane (or traces) 524, a power plane (or traces) 526 between first and second ground planes 522 and 524, and a single-ended feedback line 525. The first and second ground planes 522 and 524 as well as the power plane 526 may be disposed in different layers of a printed circuit board (PCB). Power plane 526 may be coupled between a power output terminal 512 of power management circuit 510 (denoted as $V_{PMIC}$ in FIG. 5) and a power input terminal 532 of multi-core processor 530 (denoted as $V_{CPU}$ in FIG. 5). The second ground plane 524 may be coupled between a first ground terminal 514 of power management circuit 510 (denoted as GND in FIG. 5) and a second ground terminal 534 of multi-core processor 530 (denoted as GND in FIG. 5). In some implementations, a capacitance of the one or more decoupling capacitors 528 may be from 0.1 µF to 22 µF in the PCB and from 1 µF to 2.2 µF in the package of power delivery network 520.

Feedback line 525 may be an electrically-conductive trace on a PCB (not shown), and may be coupled between a positive feedback terminal 516 of power management circuit 510 (denoted as FB+ in FIG. 5) and the power input terminal 532 of multi-core processor 530. In some implementations, feedback line 525 may be electromagnetically shielded from external noise with power plane 526, the second ground plane 524, or both power plane 526 and the second ground plane 524 of power delivery network 520. In some implementations, a width of feedback line 525 may be no more than 8 mil. In some implementations, a space between feedback line 525 and power plane 526 may be no more than 8 mil. Alternatively or additionally, a space between feedback line 525 and the second ground plane 524 may be no more than 8 mil.

Further example implementations of parts of structure 500 are described below and shown in FIG. 6 and FIG. 7.

Figure 6:
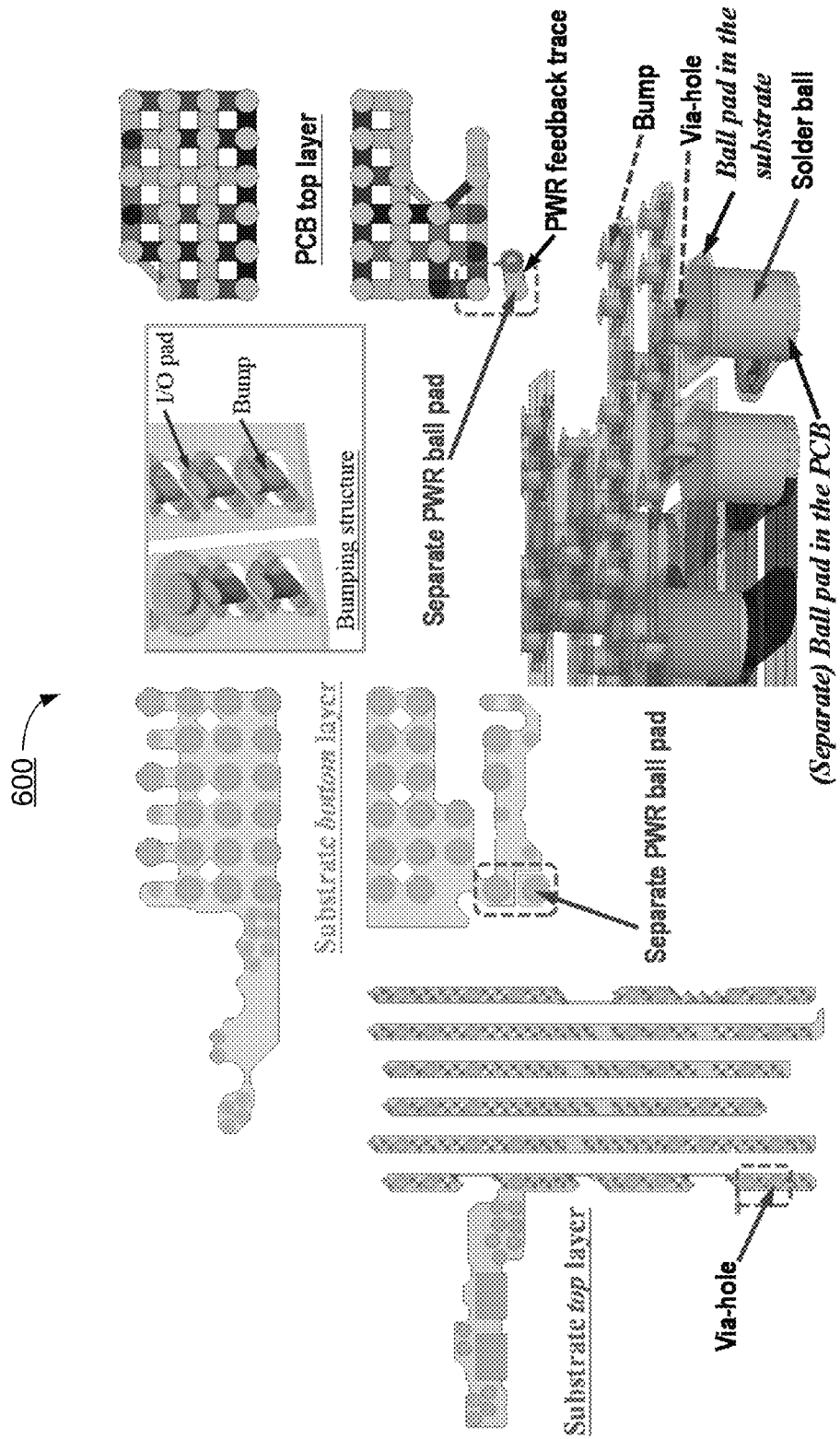
FIG. 6 is a diagram of an example connection in accordance with the present disclosure.

FIG. 6 illustrates an example connection 600 regarding a connection between an external feedback line and a multi-core processor in accordance with the present disclosure. Connection 600 may be implemented in apparatus 300 and structure 500 described above. That is, connection 600 may be implemented as the connection between feedback line 325 and multi-core processor 330 and/or between feedback line 525 and multi-core processor 530.

Connection 600 may be implementable when the feedback line (e.g., feedback line 325 and/or feedback line 525) and the IC package with a multi-layer substrate containing the multi-core processor (e.g., multi-core processor 330 and/or multi-core processor 530) are disposed on a top layer (or a bottom layer) of a multi-layer board (e.g., a PCB). The power management circuit (e.g., power management circuit 310 and/or power management circuit 510) may be enclosed, contained or otherwise packaged in a first IC package, and the multi-core processor (e.g., multi-core processor 330 and/or multi-core processor 530) may be enclosed, contained or otherwise packaged in a second IC package. Referring to FIG. 6, the multi-layer substrate may include a separate power ball pad or a separate power finger on the top layer of the multi-layer board. The feedback line may be coupled between a power ball or a power pin associated with the first IC package (in which the power management circuit is packaged) and the separate power ball pad or the separate power finger on the top layer of the multi-layer board. The separate power ball pad or the separate power finger on the top layer of the multi-layer board may be also connected to a separate power ball or a separate power pin associated with the second IC package (in which the multi-core processor is packaged). The separate power ball or the separate power pin may be connected to a power net (e.g., a part of power delivery network in the second IC package) in the top layer of the multi-layer substrate (in the second IC package) through at least one via-hole where bumps are formed and connected with the multi-core processor through chip input/output (I/O) pads. In another embodiment, the separate power ball pad or finger on the top layer of the multi-layer board may be merged with one or more adjacent power ball pads or fingers on the same electric power level.

Figure 7:
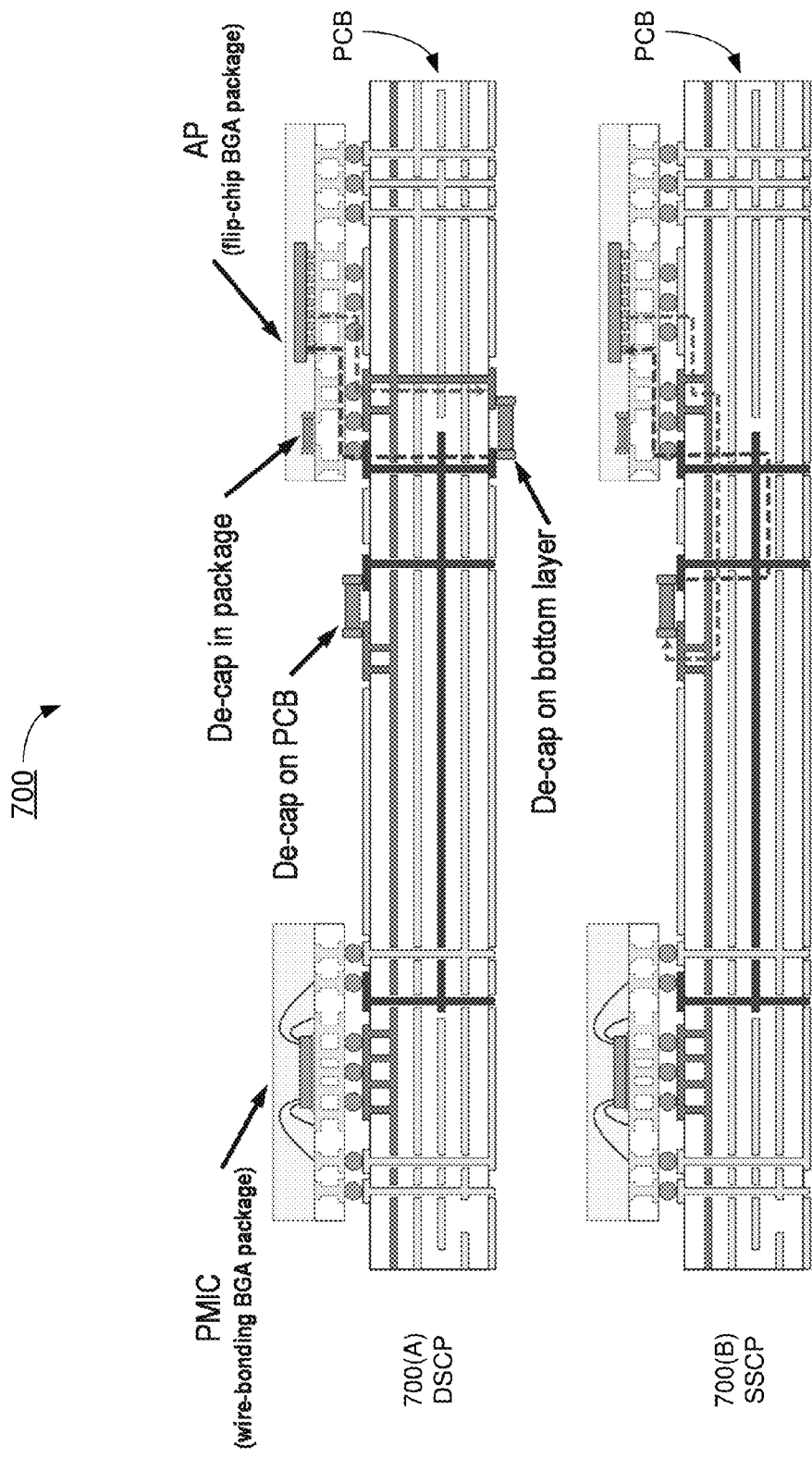
FIG. 7 is a diagram of example component placement configurations in accordance with the present disclosure.

FIG. 7 illustrates example component placement configurations 700(A) and 700(B) in accordance with the present disclosure. Each of configurations 700(A) and 700(B) may be utilized in apparatus 300, apparatus 400 and/or structure 500. Configuration 700(A) may be a double-sided component placement (DSCP) configuration. Conversely, configuration 700(B) may be a single-sided component placement (SSCP) configuration.

In configuration 700(A), a power management circuit may be packaged in a first IC package which is mounted on a top layer of a multi-layer board (e.g., a PCB) via a wire-bonding ball grid array (BGA). Additionally, a multi-core processor may be packaged in a second IC package which is mounted on the top layer of the multi-layer board via a flip-chip BGA. Moreover, at least one decoupling capacitor may be disposed on the top layer of the multi-layer board while at least one other decoupling capacitor may be disposed on a bottom layer of the multi-layer board opposite the top layer thereof.

In configuration 700(B), a power management circuit may be packaged in a first IC package which is mounted on a top layer of a multi-layer board (e.g., a PCB) via a wire-bonding BGA. Additionally, a multi-core processor may be packaged in a second IC package which is mounted on the top layer of the multi-layer board via a flip-chip BGA. Moreover, all of one or more decoupling capacitors may be disposed on the top layer of the multi-layer board with no other decoupling capacitor disposed on a bottom layer of the multi-layer board opposite the top layer thereof. For example, the PCB thickness may be no more than 1.2 mm and a distance between a decoupling capacitor disposed on the top layer of the multi-layer board and the multi-core processor packaged in the second IC package may be greater than 5 mm. Therefore, the decoupling path of the DSCP configuration shown in 700(A) is shorter than that of the SSCP configuration shown in 700(B). Accordingly, the SSCP configuration shown in 700(B) may suffer larger power impedance and voltage droop when one or more processing units of the multi-core processor are started.

Figure 8:
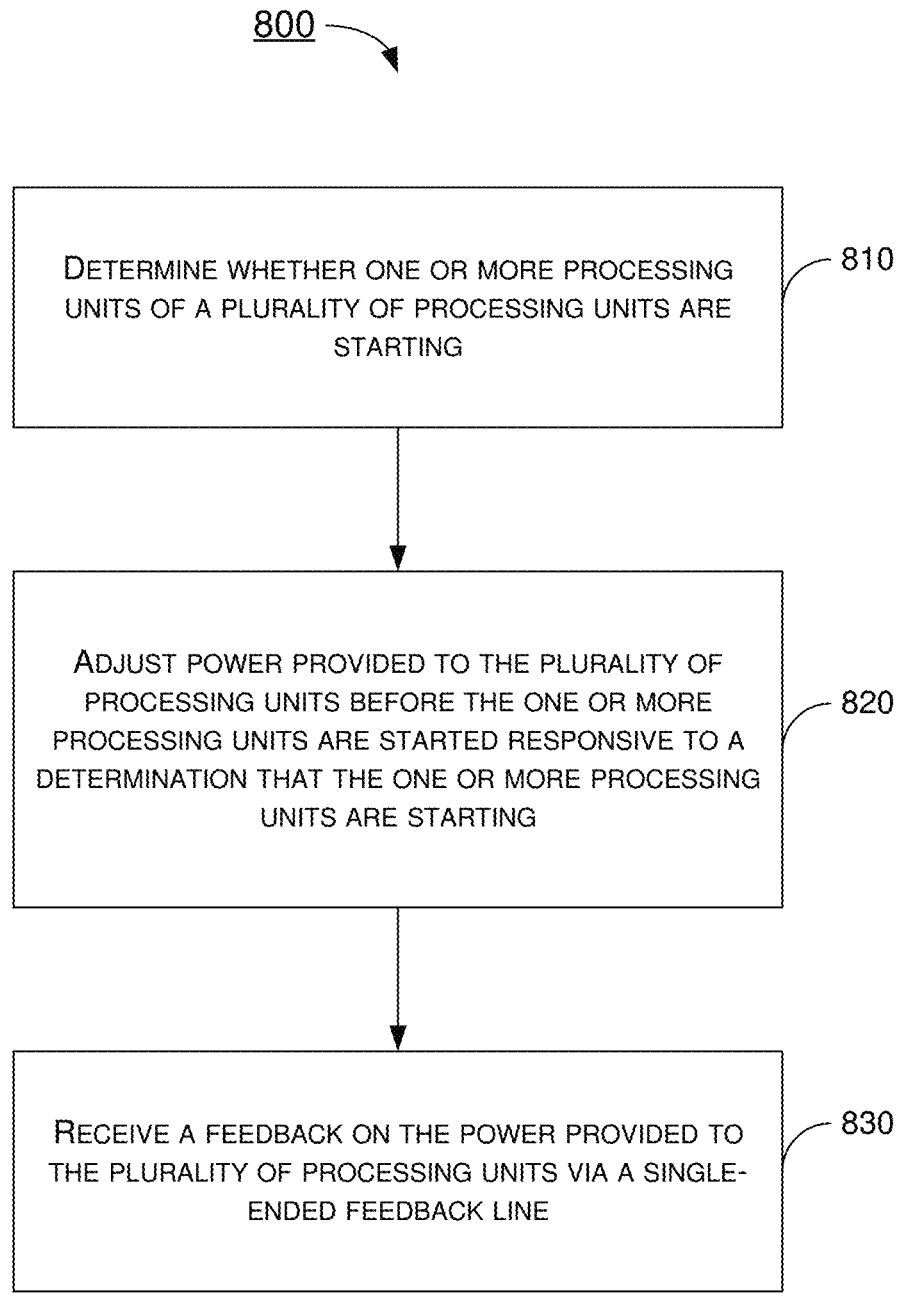
FIG. 8 is a flowchart of an example process in accordance with an implementation of the present disclosure.

FIG. 8 illustrates an example process 800 in accordance with an implementation of the present disclosure. Process 800 may include one or more operations, actions, or functions as represented by one or more blocks such as blocks 810, 820 and 830. Although illustrated as discrete blocks, various blocks of process 800 may be divided into additional blocks, combined into fewer blocks, or eliminated, depending on the desired implementation. The blocks may be performed in the order shown in FIG. 8 or in any other order, depending on the desired implementation. Process 800 may be implemented by apparatus 300 and apparatus 400 described above. Solely for illustrative purpose and without limiting the scope of the present disclosure, process 800 is described below in the context of process 800 being performed by apparatus 300. Process 800 may begin at 810.

At 810, process 800 may involve power management circuit 310 of apparatus 300 determining whether one or more processing units of a plurality of processing units 336(1)-336(N) of multi-core processor 330 are starting. Process 800 may proceed from 810 to 820.

At 820, process 800 may involve power management circuit 310 of apparatus 300 adjusting power provided to the plurality of processing units 336(1)-336(N) before the one or more processing units are started responsive to a determination that the one or more processing units are starting.

In some implementations, in determining whether the one or more processing units 336(1)-336(N) are starting, process 800 may involve power management circuit 310 of apparatus 300 receiving, via serial bus 340, a signal indicating that the one or more processing units are starting. For example, power management circuit 310 may receive, via serial bus 340, a signal including one or more commands from multi-core processor 330 that trigger power management circuit 310 to initiate early power compensation.

In some implementations, in adjusting the power provided to the plurality of processing units 336(1)-336(N) before the one or more processing units are started, process 800 may involve power management circuit 310 of apparatus 300 increasing the power provided to the plurality of processing units 336(1)-336(N) at least a period of time before the one or more processing units are started. The period of time may be based at least in part on a speed of serial bus 340, an amount of charging time for charging one or more decoupling capacitors 328, a quantity of the one or more processing units that are starting, or a combination thereof.

Alternatively or additionally, in adjusting the power provided to the plurality of processing units 336(1)-336(N), process 800 may involve power management circuit 310 of apparatus 300 performing a number of operations. For example, process 800 may involve power management circuit 310 determining, using a lookup table, an amount of power increase and an amount of time for the power increase based on a quantity of the one or more processing units that are starting. Moreover, process 800 may involve power management circuit 310 increasing the power provided to the plurality of processing units 336(1)-336(N) by the determined amount of power increase and for the determine amount of time.

Alternatively or additionally, in adjusting the power provided to the plurality of processing units 336(1)-336(N), process 800 may involve power management circuit 310 of apparatus 300 adjusting a voltage, an operating frequency, a system clock, or a combination thereof with respect to the power provided to the plurality of processing units 336(1)-336(N).

Optionally, process 800 may proceed from 820 to 830. At 830, process 800 may involve power management circuit 310 of apparatus 300 receiving a feedback on the power provided to the plurality of processing units 336(1)-336(N) via single-ended feedback line 325.

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
receiving power from a power source;
regulating the received power to provide regulated power to a processor via a power delivery network;
determining whether one or more processing units of a plurality of processing units of the processor are starting; and
adjusting an amount of the regulated power provided to the plurality of processing units before the one or more processing units are started responsive to a determination that the one or more processing units are starting,
wherein the adjusting of the amount of the regulated power provided to the plurality of processing units before the one or more processing units are started comprises charging at least one decoupling capacitor of one or more decoupling capacitors of the power delivery network for at least an amount of charging time proportional to a quantity of the one or more processing units that are starting.

2. The method of claim 1, wherein the determining of whether the one or more processing units are starting comprises receiving, via a serial bus, a signal indicating that the one or more processing units are starting.

3. The method of claim 2, wherein the adjusting of the amount of the regulated power provided to the plurality of processing units before the one or more processing units are started further comprises increasing the power provided to the plurality of processing units at least a period of time before the one or more processing units are started, and wherein the period of time is based at least in part on a speed of the serial bus, an amount of charging time for charging one or more decoupling capacitors, a quantity of the one or more processing units that are starting, or a combination thereof.

4. The method of claim 1, wherein the adjusting of the amount of the regulated power provided to the plurality of processing units further comprises:
determining, using a lookup table, an amount of power increase and an amount of time for the power increase based on a quantity of the one or more processing units that are starting; and
increasing the power provided to the plurality of processing units by the determined amount of power increase and for the determine amount of time.

5. The method of claim 1, wherein the adjusting of the amount of the regulated power provided to the plurality of processing units further comprises adjusting a voltage, an operating frequency, a system clock, or a combination thereof to increase the power provided to the plurality of processing units.

6. The method of claim 1, further comprising:
receiving a feedback on the power provided to the plurality of processing units via a single-ended feedback line.

7. An apparatus, comprising:
a power management circuit;
a processor comprising a plurality of processing units;
a serial bus coupled between the power management circuit and the processor; and
a power delivery network coupled between the power management circuit and the processor,
wherein the processor is configured to determine whether one or more processing units of the plurality of processing units are starting,
wherein the power management circuit is further configured to adjust an amount of the regulated power provided to the processor before the one or more processing units are started responsive to a determination by the processor that the one or more processing units are starting, wherein the power management circuit is configured to receive and regulate power from a power source and provide regulated power to the processor via the power delivery network, wherein the power delivery network comprises one or more decoupling capacitors, and wherein, in adjusting the amount of the regulated power provided to the processor before the one or more processing units are started, the power management circuit is configured to charge at least one decoupling capacitor of the one or more decoupling capacitors for at least an amount of charging time proportional to a quantity of the one or more processing units that are starting.

8. The apparatus of claim 7, wherein the power management circuit is configured to receive, from the processor via the serial bus, a signal indicating that the one or more processing units are starting, and wherein the serial bus comprises an inter-integrated circuit (I2C) bus, a serial peripheral interface (SPI) bus, a system management bus (SMB), or a serial low-power inter-chip media bus (SLIMbus).

9. The apparatus of claim 7, wherein, in adjusting the amount of the regulated power provided to the processor before the one or more processing units are started, the power management circuit is configured to increase an amount of the regulated power provided to the processor at least a period of time before the one or more processing units are started.

10. The apparatus of claim 9, wherein the period of time is based at least in part on a speed of the serial bus, an amount of charging time for charging at least one decoupling capacitor of the one or more decoupling capacitors of the power delivery network, a quantity of the one or more processing units that are starting, or a combination thereof.

11. The apparatus of claim 7, wherein, in adjusting the amount of the regulated power provided to the processor before the one or more processing units are started, the power management circuit is configured to perform operations comprising:

determining, using a lookup table, an amount of power increase and an amount of time for the power increase based on a quantity of the one or more processing units that are starting; and increasing the amount of regulated power provided to the processor by the determined amount of power increase and for the determine amount of time.

12. The apparatus of claim 7, wherein, in adjusting the amount of the regulated power provided to the processor before the one or more processing units are started, the power management circuit is configured to adjust a voltage, an operating frequency, a system clock, or a combination thereof with respect to the regulated power provided to the processor.

13. The apparatus of claim 7, wherein a height of the one or more decoupling capacitors is less than 1.25 mm, and wherein the amount of charging time is at least an amount of time that allows the at least one decoupling capacitor to be charged to compensate for less than 12% voltage droop, as measured from a steady-state voltage level, when the one or more processing units are started.

14. The apparatus of claim 7, wherein the power management circuit is enclosed in a first integrated-circuit (IC) package, wherein the power management circuit comprises an error amplifier having a first input port and a second input port, wherein the first input port is connected to a power ball or a power pin of the first IC package, and wherein the second input port is connected to a local ground plane of the first IC package.

15. The apparatus of claim 7, further comprising:

a multi-layer board on which the processor is disposed, wherein the power delivery network comprises a single-ended feedback line disposed in the board and coupled between the power management circuit and the processor, and wherein the power management circuit is configured to receive, via the feedback line, a feedback on the regulated power provided to the processor.

16. The apparatus of claim 15, wherein the power management circuit is enclosed in a first integrated-circuit (IC) package and the processor is enclosed in a second IC package, wherein the first IC package and the second IC package are disposed on a top layer of the board, wherein the board comprises a separate power ball pad or a separate power finger on the top layer thereof, wherein the feedback line is coupled between a power ball or a power pin associated with the first IC package and the separate power ball pad or the separate power finger on the top layer of the board, and wherein the separate power ball pad or the separate power finger on the top layer of the substrate is connected to a separate power ball or a separate power pin associated with the second IC package.

17. The apparatus of claim 15, wherein the power delivery network comprises one or more decoupling capacitors, and wherein at least one decoupling capacitor of the one or more decoupling capacitors is mounted on the board in a single-sided component placement (SSCP) configuration with respect to the processor.

18. The apparatus of claim 15, wherein the power delivery network comprises a power plane and a ground plane, and wherein the feedback line is electromagnetically shielded from external noise with the power plane, the ground plane, or both the power plane and the ground plane of the power delivery network.

19. The apparatus of claim 18, wherein a width of the feedback line is no more than 8 mil, and wherein at least a space between the feedback line and the power plane or a space between the feedback line and the ground plane is no more than 8 mil.

* * * * *